United States Patent
Lo et al.

(10) Patent No.: US 11,144,749 B1
(45) Date of Patent: Oct. 12, 2021

(54) CLASSIFYING CAMERA IMAGES TO GENERATE ALERTS

(71) Applicant: Idemia Identity & Security USA LLC, Billerica, MA (US)

(72) Inventors: Peter Zhen-Ping Lo, Mission Viejo, CA (US); Stephen Gregg, Yorba Linda, CA (US); Thomas Gruschus, Yorba Linda, CA (US)

(73) Assignee: Idemia Identity & Security USA LLC, Billerica, MA (US)

( * ) Notice: Subject to any disclaimer, the term of this patent is extended or adjusted under 35 U.S.C. 154(b) by 92 days.

(21) Appl. No.: 16/738,755

(22) Filed: Jan. 9, 2020

Related U.S. Application Data

(60) Provisional application No. 62/790,217, filed on Jan. 9, 2019.

(51) Int. Cl.
*G06K 9/00* (2006.01)
*H04N 7/18* (2006.01)
(Continued)

(52) U.S. Cl.
CPC ..... *G06K 9/00288* (2013.01); *G06K 9/00221* (2013.01); *G06K 9/00671* (2013.01);
(Continued)

(58) Field of Classification Search
CPC ............. G06K 9/6857; G06K 9/00671; G06K 9/00221; G06K 9/00288; G08B 13/19643; G08B 13/19676
See application file for complete search history.

(56) References Cited

U.S. PATENT DOCUMENTS

| 8,908,991 B2 * | 12/2014 | Bamba ................. G06T 3/0062 382/275 |
| 9,014,661 B2 * | 4/2015 | deCharms ........... G06Q 50/265 455/404.2 |

(Continued)

FOREIGN PATENT DOCUMENTS

| FR | 3015082 A1 * | 6/2015 | ......... G06K 9/00671 |
| FR | 3076360 A1 * | 7/2019 | ......... H04L 63/0853 |

(Continued)

OTHER PUBLICATIONS

X. Wang et al., "Person-of-interest detection system using cloud-supported computerized-eyewear," 2013 IEEE International Conference on Technologies for Homeland Security (HST), 2013, pp. 658-663, doi: 10.1109/THS.2013.6699082. (Year: 2013).*

(Continued)

*Primary Examiner* — John Villecco
(74) *Attorney, Agent, or Firm* — Fish & Richardson P.C.

(57) ABSTRACT

Methods, systems, and apparatus, including computer programs encoded on a computer storage medium, for receiving mission specific data. Converting the mission specific data into attribute classes recognizable by image recognition classifiers, where the image recognition classifiers are pre-trained to detect objects corresponding to the attributed classes within digital images. Obtaining, from a wearable camera system, low resolution images of a scene and high resolution images of the scene. Detecting, within the low resolution images using a low resolution image classifier, an object that corresponds to one of the attribute classes. In response to detecting the object that corresponds to one of the attribute classes, providing, for presentation to a user of the wearable camera system by a presentation system, an first alert indicating a potential detection of the suspect, and providing the high resolution images to a high resolution image classifier. Obtaining, from the high resolution image (Continued)

classifier, a confirmation of the detected object from the low resolution images. In response to obtaining the confirmation, providing, for presentation to the user by the presentation system, a second alert indicating confirmation that the object has been detected.

20 Claims, 4 Drawing Sheets

(51) Int. Cl.
  *G08B 27/00* (2006.01)
  *G08B 13/196* (2006.01)
  *G06K 9/68* (2006.01)
(52) U.S. Cl.
  CPC ..... *G06K 9/6857* (2013.01); *G08B 13/19602* (2013.01); *G08B 13/19643* (2013.01); *G08B 27/005* (2013.01); *H04N 7/185* (2013.01)

(56) References Cited

U.S. PATENT DOCUMENTS

| | | | | |
|---|---|---|---|---|
| 9,792,594 | B1* | 10/2017 | Bayha | G06Q 20/1085 |
| 9,820,120 | B2* | 11/2017 | deCharms | H04L 65/1059 |
| 10,585,939 | B2* | 3/2020 | Calcaterra | G06F 16/5866 |
| 10,699,126 | B2* | 6/2020 | Karyodisa | G06K 9/00248 |
| 10,867,219 | B2* | 12/2020 | Koskan | G06F 40/174 |
| 10,896,597 | B1* | 1/2021 | Kocher | G06K 9/00617 |
| 2005/0123201 | A1* | 6/2005 | Nakashima | G06K 9/3241 |
| | | | | 382/195 |
| 2005/0185053 | A1* | 8/2005 | Berkey | G08B 13/19689 |
| | | | | 348/155 |
| 2011/0063446 | A1* | 3/2011 | McMordie | G06K 9/209 |
| | | | | 348/159 |
| 2014/0294257 | A1* | 10/2014 | Tussy | G06F 21/32 |
| | | | | 382/118 |
| 2017/0076140 | A1* | 3/2017 | Waniguchi | H04N 21/41407 |
| 2017/0098118 | A1* | 4/2017 | Apelbaum | G06K 9/00255 |
| 2017/0351908 | A1* | 12/2017 | Wang | G06K 9/22 |
| 2017/0353699 | A1* | 12/2017 | Wang | G06K 9/00771 |
| 2018/0324177 | A1* | 11/2018 | Wang | H04W 12/126 |
| 2019/0051127 | A1* | 2/2019 | Kanga | G08B 13/19658 |
| 2019/0122516 | A1* | 4/2019 | Lorenzetti | H04N 5/772 |
| 2019/0205694 | A1* | 7/2019 | Wang | G06K 9/00268 |
| 2019/0208135 | A1* | 7/2019 | Anderson | G08B 13/19643 |
| 2019/0213420 | A1* | 7/2019 | Karyodisa | G06K 9/00288 |
| 2019/0251403 | A1* | 8/2019 | Raynor | G06K 9/209 |
| 2019/0266402 | A1* | 8/2019 | Tov | G06K 9/00295 |
| 2019/0286901 | A1* | 9/2019 | Blanco | G06K 9/00671 |
| 2019/0392830 | A1* | 12/2019 | Abdollahian | G02B 27/0176 |
| 2020/0005041 | A1* | 1/2020 | Tov | G06K 9/00288 |
| 2020/0020160 | A1* | 1/2020 | Tov | G06K 9/00671 |

FOREIGN PATENT DOCUMENTS

| | | | |
|---|---|---|---|
| JP | 09282454 A | * 10/1997 | |
| JP | 2016192703 A | * 11/2016 | |
| WO | WO-2020263110 A1 | * 12/2020 | ......... G06K 9/00979 |

OTHER PUBLICATIONS

S. Khan, M. H. Javed, E. Ahmed, S. A. A. Shah and S. U. Ali, "Facial Recognition using Convolutional Neural Networks and Implementation on Smart Glasses," 2019 International Conference on Information Science and Communication Technology (ICISCT), 2019, pp. 1-6, doi: 10.1109/CISCT.2019.8777442. (Year: 2019).*

* cited by examiner

CLASSIFYING CAMERA IMAGES TO GENERATE ALERTS

CROSS-REFERENCE TO RELATED APPLICATION

This application claims the benefit of the filing date of U.S. Provisional Application No. 62/790,217, filed on Jan. 9, 2019. The contents of U.S. Application No. 62/790,217 are incorporated herein by reference in their entirety.

TECHNICAL FIELD

This document generally relates to improvements to processing digital video using limited processing and/or communication resources.

BACKGROUND

Cameras are increasingly used by law enforcement and security personnel to record events that occur while on duty. Many law enforcement personnel such as police officers wear body-worn cameras alongside their badges, clipped to their uniforms, or worn as a headset. Footage from body cameras can be used as evidence for a case. When responding to a call, police officers may look for suspects based on provided information such as a written description, or images of a suspect, such as a mugshot. Additionally, police officers on duty must be aware of certain objects, such as weapons, and events, such as a person running. Improvements to body-worn cameras that would enable automatic detection, recognition, and alerts for people, objects, and events, are desirable.

SUMMARY

This specification generally relates to improvements to image capture systems (e.g., wearable digital video systems) to perform image recognition tasks such as facial recognition and object recognition. For example, implementations classify both low resolution and high resolution camera imagery to identify faces or objects within the imagery and, optionally, generate alerts based on the presence of certain objects, events, or people. Implementations of the present disclosure are generally directed to systems, devices, and methods alerting the user of an image capture device to certain features of captured images. The proposed techniques seek to assist law enforcement and security personnel in identifying images while using body-worn cameras on duty. The wearable camera system may be linked to GPS, and may alert an officer when he or she is approaching a geographical area where an event has occurred. Additionally, the wearable camera system may use audio data as well as imagery to identify people, objects, and events.

In some implementations, image recognition classifiers are pre-trained to detect objects corresponding to the attributed classes within digital images to, e.g., appropriately classify imagery. Attributed classes may include colors, shapes, clothing items, and physical descriptors of people, such as age, weight, skin tone, and hair length. Image recognition classifiers are trained using training data comprised of many images and their corresponding descriptions.

A camera or set of cameras may be connected to (e.g., in electronic communication with) one or more processors of a wearable camera system. When a law enforcement officer is assigned a mission, mission-specific data can be input into the wearable camera system. The mission-specific data can include image data as well as non-image data, such as text or voice data. Image data can include, for example, surveillance footage of a suspect or a mugshot of a suspect. Non-image data may describe attributes of a subject. For example, the non-image data may describe the age, weight, height, hair color, and eye color of a suspect. The system converts the mission-specific data into attributed classes recognizable by the pre-trained image recognition classifiers.

The wearable camera system obtains, from one or more cameras, both low resolution and high resolution images of a scene. When the wearable camera system detects an object that corresponds to one of the attribute classes within a low resolution image, the wearable camera system can provide a first alert to the user. The first alert can indicate the potential detection of a suspect, or the detection of a certain object or event. The processors can also provide the high resolution images of the scene to a high resolution image classifier. The high resolution image classifier may confirm the classification of the detected object. In response to obtaining the confirmation, the wearable camera system can provide a second alert to the user, indicating confirmation that the suspect or a certain object or event has been detected.

In general, innovative aspects of the subject matter described in this specification can be embodied in methods that include the actions of obtaining, in real-time from an image capture device, both low resolution and high resolution images. The low resolution images are analyzed for the presence of certain people, objects, or events, while the high resolution images are archived, and used for confirmation when a detection is noted by the low resolution image recognition classifier.

Additional innovative aspects of the subject matter described in this specification can be embodied in methods of alerting a camera user to a detection. The alerts may be any audible, text, or tactile notification such as vibration of a body worn camera or a tactile output device, a spoken voice or beeping sound in a headset, a mobile device text message or ring tone, or a text or image display on a "head's up" device (e.g., a hologram projected in a helmet visor or within the lenses of a pair of glasses worn by an officer). The alerts may be sent to various systems and personnel. For example, the alerts may be sent only to the user, to a group of police officers within an area, and/or to the police station.

These and other implementations can each optionally include one or more of the following features.

In some implementations, the body-worn camera device has more than one mode, including both low resolution and high resolution modes within the same camera.

In some implementations, the body-worn camera device contains more than one separate cameras, including both low resolution and high resolution cameras.

In some implementations, the camera device may be located somewhere other than on a person's body, such as mounted to a vehicle.

In some implementations, the description of a suspect is provided through a combination of text description, voice description, and image data.

In some implementations, the body-worn camera device contains a processor to process camera imagery.

In some implementations, the image processor can be located in other locations, such as in a vehicle, at a police station, or can be cloud-based.

In some implementations, an individual user can wear more than one body-worn camera. For example, cameras can be arranged on the front and back of a user's torso.

In some implementations, more than one wearable camera system provides information to a server. The server can aggregate the imagery and information, such as GPS information, from multiple body-worn cameras to triangulate the location of a suspect or object.

In some implementations, a wearable camera system can record the video images, including any detections and alerts, for use in after-action reports and/or court cases.

These and other implementations can each provide one or more advantages. In some examples, implementations of the present disclosure improve recognition of people, objects, or events.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

A body-worn camera can be integrated with a system and method to provide alerts to a user based on detected imagery. To do this, a wearable camera system detects descriptive attributes of the image captured from a camera. The camera system can detect potential dangerous events while the officer on duty, such as a person approaching with a knife, a driver operating a vehicle erratically, or a group of people fighting.

Figure 1:
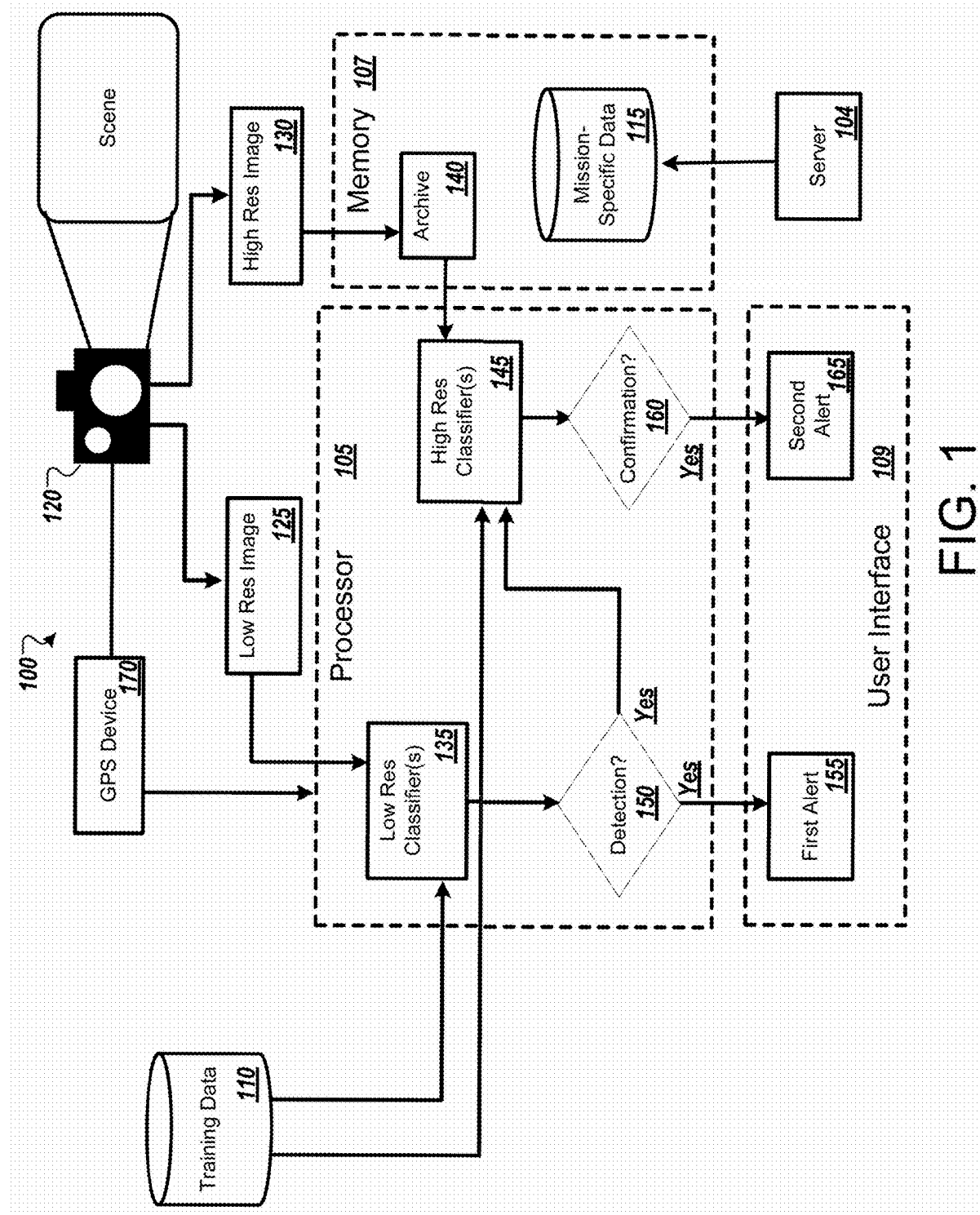
FIG. 1 depicts an example system according to implementations of the present disclosure.

FIG. 1 depicts an example wearable camera system 100 according to implementations of the present disclosure. The system 100 includes one or more body-worn cameras 120, a processing unit 105, memory 107, a communication link between the camera and the processing unit 105, a GPS unit 170, and a user interface 109. The processing unit 105 can be, but is not limited to, a mobile computing device (e.g., a smart phone), a mobile computer in police car, or a mobile processing unit (e.g., a self-contained processor as part of the wearable camera system 100).

The wearable camera system 100 can include multiple body worn cameras 120. For example, the system 100 can include pairs of low and high resolution cameras facing forward and backwards. For example, the system can be mounted on a helmet or vest with front and rear pairs of cameras.

The user interface 109 can provide an officer with both input and output interfaces. Example input interfaces can include, but are not limited to, a wearable touch screen (e.g., as a watch) and audio input (e.g., microphones to receive voice commands). Example output interfaces can include, but are not limited to, any combination of visual, audio, and tactile output interfaces. For example, a visual output interface can include a head's up display projected on a helmet visor or within the lenses of a pair of glasses. An example, tactile output can include vibration devices on positioned at different locations on a vest, and arranged to prompt the officer to look in a direction that corresponds with a location of each sensor (e.g., vibration on a right shoulder may indicate that the officer should look over his/her right shoulder).

In some implementations, the processing unit 105 is in communications with a backend server system 104 (e.g., a law enforcement dispatch server system, a cloud computing server, or both). For example, processing unit 105 can communicate with server system 104 and other wearable camera systems over network. In some examples, the network can include a large network or combination of networks, such as a cellular network, a WIFI network, a wide area network (WAN), the Internet, a satellite network, or a combination thereof connecting any number of mobile clients, fixed clients, and servers.

Prior to a mission, the wearable camera system 100 is trained with a set of training data 110. The training data 110 can include a set of pre-collected descriptive attribute images, such as colors and articles of clothing. Additionally, training data can include a set of continuous frame images related to a set of events, such as images of a fight, images of a person brandishing a weapon, and images of a person running or walking toward and away from the camera. Training data 110 may also include facial images of people of various genders, skin tones, races, ages, etc. The training data 110 is fed to the wearable camera system 100 along with identifying characteristics. This enables the wearable camera system 100 to recognize various facial features in order to recognize a suspect in an image.

When a user (e.g., an officer) begins a mission, the user can input mission-specific data 115 into the system 100. For example, the system 100 can present an interface to the user that allows the user to input mission-specific data 115. In some examples, the system 100 can receive mission-specific data 100 from a law-enforcement server system 104. For example, the system 100 can download mission-specific data 115 from a dispatch system or a 911-system to local memory 107. The mission-specific data 115 can be in the form of text or voice descriptions, such as descriptions of the clothing and appearance of a suspect. A text or voice description may also include a description of events, such as a person using a weapon. In some implementations, the mission-specific data 115 may include supplemental images, such as a mugshot or surveillance footage of a suspect, or an image of a license plate or vehicle. In such implementations, the wearable camera system 100 can obtain the supplemental images from the server system 104 (e.g., a law enforcement dispatch server system) and store the images in the memory 107.

The mission-specific data 115 can be sent to the wearable camera system 100 through various paths. For example, the dispatching police office may upload data to the processor after receiving an emergency call. Alternatively, an officer who receives a call via radio may upload the mission-specific data 115 via text or voice command through a user interface on a device such as a mobile device. In another example, a suspect's description or image may be sent from a law enforcement agency to many wearable camera systems at the same time. For example, if a law enforcement agency is searching for a suspect who is on the loose, the suspect's image and description may be uploaded to all wearable camera systems within a certain radius of the suspect's last known location.

Once the wearable camera system 100 receives the mission-specific data 115, the processor 105 converts the text or voice description of the suspect or event into pre-defined attribute class labels, and selects pre-trained classifiers. Attribute classes can include, but are not limited to, male vs female; young (18 to 30), middle aged (30 to 60), old (above 60); body size (tall, medium height, short, fat, skinny); skin color; wearing a hat or not; hat color; wearing glasses or not; facial hair or not; hair length; hair color, hair style; clothing type and color; tattoos; face shape; facial features (small/ large eyes, eye color, forehead height; actions (running/ walking, arguing, fighting); weapons (carrying a gun, knife). For example, if the mission-specific data includes description of a suspect as a male between the ages of 20 and 25 with long hair, wearing jeans, a white T-shirt, and a red hat, the processor sorts the details of the description into attribute classes, e.g., gender=male; age=young; hair length=long; hat=yes, red; clothing=blue pants, white T-shirt. The processor can use the attribute classes to select and assign the mission-specific data to appropriate classifiers, e.g., classifiers that have been pre-trained for those descriptions. For example, once the descriptors from the mission specific data are sorted into appropriate attribute classes, the sorted data can be supplied to each selected classifier as input data that indicates the attribute values that each classifier will be searching for in images from the wearable cameras. In some implementations, each attribute classes is associated with a particular type of classifier. That is, the attribute classes may be defined based on the type of classifiers available for low and high resolution image analysis. And, the classifier type can be distinguished based on the type of data (e.g., attribute class) that each classifier was trained on. If the mission-specific data includes images of a suspect, the wearable camera system 100 saves the suspect images to the memory 107.

Once on a mission, a set of body worn cameras 120 collects a set of low resolution images 125 and high resolution images 130 that can be used to detect suspects, objects, or events in the images using the pre-trained classifiers. Both low and high resolution images 125 and 130 can be collected simultaneously. The low resolution images 125 are sent to a low resolution classifier 135, while the high resolution images 130 are stored in an archive 140.

Detection can be performed in two stages, first using the low resolution images 125, then the higher resolution images 130. This enables the system to perform detection under constrained communication bandwidth and computation power. One processor 105 may be required to process imagery from more than one wearable camera system 100.

To perform initial detection 150, lower resolution images 125 from the cameras 120 are evaluated by the lower resolution classifier 135 within the processor 105. The classifier looks for the attributes of the suspects, objects, and/or events that were provided in the mission-specific data 115, using the patterns established in the training data 110. The low resolution images 125 are used to make an initial detection 150. For example, if a suspect is described as wearing a red hat, and the low-resolution image classifier 135 detects the presence of a red hat, an initial detection 150 is made. A first alert 155 is given to the officer to notify him or her that there may be a suspect match. The first alert may be a text or voice message, and may state, for example: "potential suspect wearing red hat, processing further." The high resolution image 130 in the archive 140 of the person wearing the red hat is then evaluated by the high resolution classifier 145 for more detailed inspection.

The high resolution classifier 145 conducts a detailed inspection of the high resolution image 130 to confirm or refute the initial detection. For example, the high resolution classifier 145 may examine the facial features of the person wearing the red hat, and compare these facial features with the description and/or image provided of the suspect. In another example, if the low resolution classifier 135 detects the potential presence of a weapon, the high resolution classifier 145 evaluates the high resolution image 130 to confirm or refute that there is a weapon on the scene. If the high resolution classifier 145 confirms the initial detection, a second alert 165 is sent to the officer. If the initial detection 150 is refuted, a notification is sent to the officer that the initial detection 150 was a false alarm.

In some implementations, the high resolution classification is performed on a remote processing system with increased capabilities. For example, the wearable camera system 100 can send the high resolution images 130 to the remote processing system (e.g., server system 104 or a vehicle based computing system in the officer's vehicle) for conducting the high resolution classification and receive classification data back from the remote processing system. In such implementations, the high-resolution classifier 145 can be stored at the remote processing system. In some implementations, the remote processing system can be, but is not limited to, a cloud-based server system or a computing system in the officer's vehicle. In some examples, high resolution classifiers are implemented as convolutional neural networks (CNN) with deep learning, e.g., to obtain high accuracy object recognition, facial recognition, and/or event recognition.

The system includes a method for user-selected tradeoff between the reduction of false detection and the improvement of positive detection alert. The user can adjust the tradeoff between the reduction of false detection and the improvement of positive detection alert using several sets of thresholds. For example, implementations can provide user adjustable detection threshold settings.

After the higher resolution images 130 are processed by the high resolution classifier 145, the wearable camera system 100 makes a confirmation decision 160. The high resolution classifier 145 either confirms or refutes the initial detection made by the low resolution classifier 135. If the initial detection is confirmed, a second alert 165 is sent to the officer.

Multiple types of alerts may be made to an officer or group of officers. The alerts may be any audible, visible, text, or tactile notification such as vibration of a body worn camera, a spoken voice or beeping sound in a headset, a mobile device text message or ring tone, a flashing light, or a text or image display on a "head's up" device. The alerts may be sent to various systems and personnel. For example, the alerts may be sent only to the user, to a group of police officers within an area, and/or to the police station.

Some examples of alerts include vibration of a camera device or mobile device. Vibration patterns may be used to indicate certain detections. For example, if an officer is wearing cameras on the front and back of the torso, a short vibration may indicate a suspect detected in front, while a long vibration may indicate a suspect detected in back. Certain vibrations may indicate other detections, such as the detection of another police officer in the camera's field of view. Alerts may also include audible alerts such as various tones, beeps, and ringtones, played through a speaker or in an earpiece. Additionally, text messages may be sent to a mobile device or to a "head's up" device that is displayed on a screen in front of the user's eyes. A text message may say, for example, "unknown person approaching from behind." Alerts may also notify police officers of detections made by other devices, and include the location of detection. For example, a text alert may say, "suspect detected in Officer Smith's vicinity, 100 yards to the east."

The types of alerts may be configured by a user depending on their preferences and situation. For example, if an officer is in a loud area, he or she may choose vibration or text alerts over audible alerts.

The system may include a GPS device 170. The GPS device can be used to automatically turn on the system when approaching an area of interest. This can save battery power and bandwidth and processing power. Power can be saved by only turning on the system when in an area of interest, unless manually activated by the police officer. To identify GPS locations of interest, a police officer or the police dispatch may enter the GPS location of an incident into the system. When the officer comes close to the incident location, the system can automatically switch on, and the system notifies the officer that he or she is approaching the location of interest.

Figure 2:
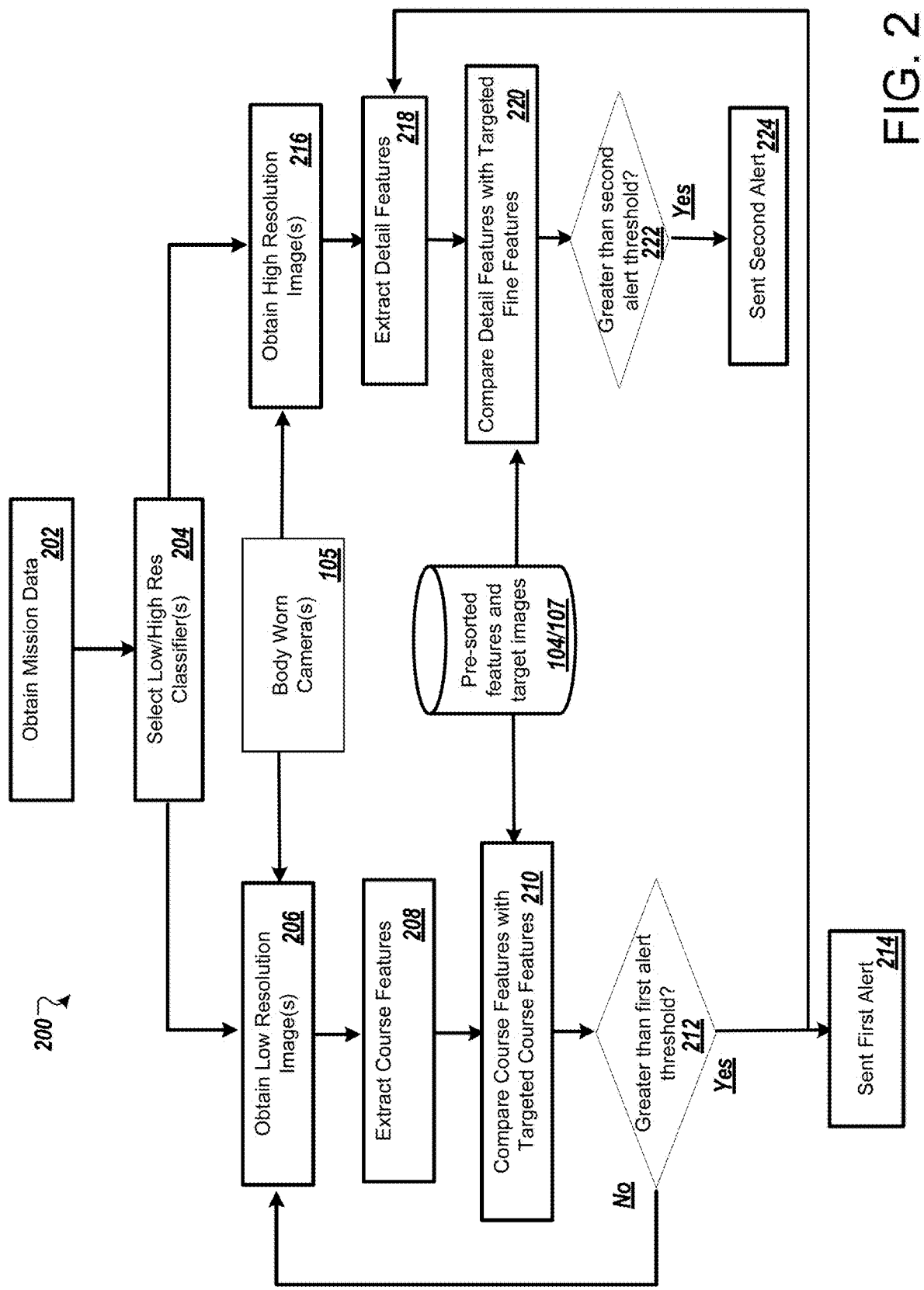
FIG. 2 depicts flowchart of an example process for classifying and detecting target images according to implementations of the present disclosure.

FIG. 2 depicts a flowchart of an example process 200 for classifying and detecting target images. In some implementations, process 200 can be provided as one or more computer-executable programs executed using one or more computing devices. In some examples, the process 200 is executed by a system such as the wearable camera system 102 of FIG. 1, or a separate computing system such as server system 104. In some implementations, all or portions of process 300 can be performed on a local computing device, e.g., wearable camera system 102. In some implementations, all or portions of process 300 can be performed on a remote computing device, e.g., a cloud-based server system.

The system obtains mission-specific data (202). For example, the system can receive mission-specific data as direct user input, e.g., as input directly from the officer wearing the system. The system can receive mission-specific data as a data download from a remote server system, e.g., a law enforcement dispatch system. The mission-specific data 115 can be in the form of text or voice descriptions. The mission-specific data can include, but is not limited to descriptions of a suspect (e.g., clothing type and color, appearance, size, build), vehicle information (e.g., vehicle color, make, model, license plate number), a description of an event (e.g., an argument, fight, shooting, etc.), identification of a weapon (e.g., a gun, knife, pipe), or a combination thereof.

The system selects low and high resolution classifiers (204). For example, the system can select classifiers based on attribute classes of the mission-specific data. As discussed above, descriptive information from the mission-specific data can be sorted into attribute classes that correspond with the types of classifiers available for object detection and confirmation. The a classifier type can be distinguished based on the type of data (e.g., attribute class of data) that each classifier was trained on. The sorted descriptive information can then be provided as input data, indicating the particular objects to be searched for, to classifiers associated with each attribute class. For example, the sorted mission-specific data can be stored in local memory 107 or at a server 104 as "pre-sorted features/target images" and applied as classifier input when needed.

Figure 3:
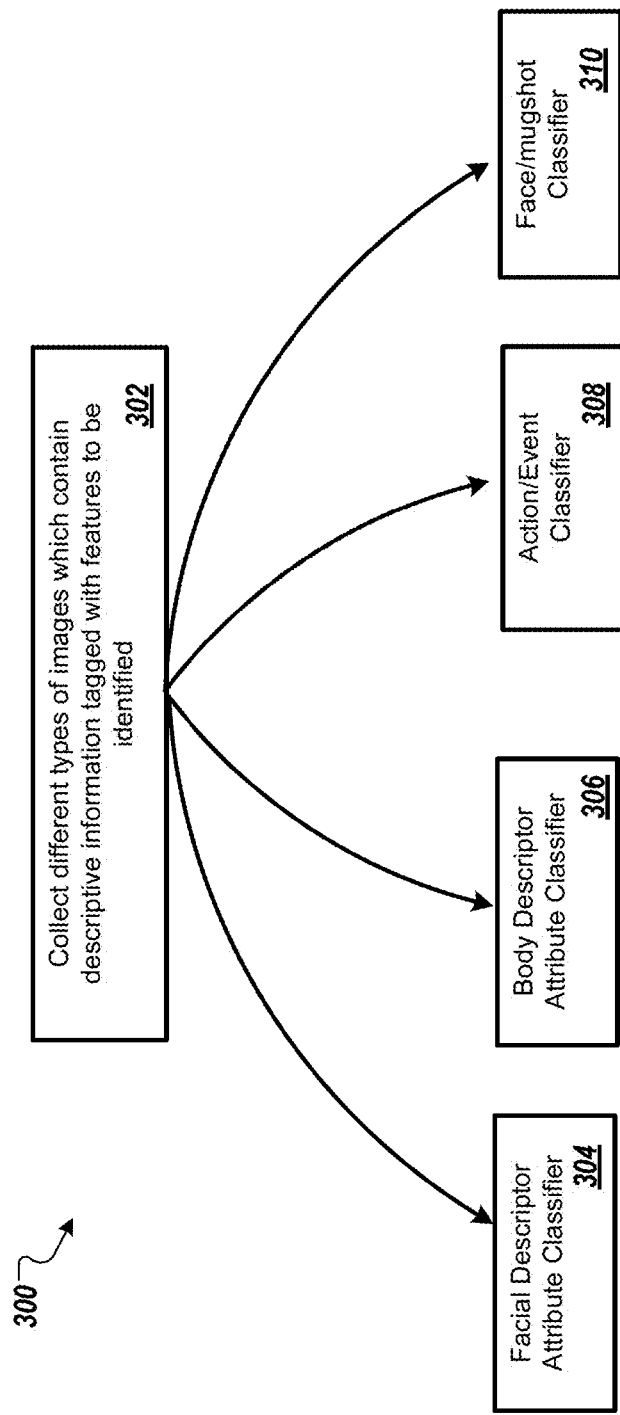
FIG. 3 depicts various classifiers that can be used by the system to classify and detect target images.

For example, FIG. 3 depicts various classifiers that may be used by the system to classify and detect target images. Classifiers may include a facial descriptor classifier 304, a body descriptor classifier 306, an action/event classifier 308, and a face/mugshot classifier 310. Each classifier is trained on various different types of images 302 that contain descriptive information tagged with the features to be identified by the particular classifier (e.g., labeled data sets). The training defines the type of the classifier. For example, a facial descriptor classifier 304 can be trained to detect facial attributes such as, such as male or female, age range, skin color, hair color, the presence of facial hair, and the presence of eyeglasses. A body descriptor classifier 306 can be trained to detect body attributes such as height and weight, and clothing descriptors including colors and types of clothing, male and female body shapes, etc.

Action and event classifiers may include a description of something that suspect is carrying or doing. Such classifiers can include descriptions such as a person running, carrying a knife, riding a bicycle, wearing a backpack, etc. An action/event classifier 308 can be trained to detect particular types of movement or facial expressions from a series of image frames such as arguing, fighting, running, walking, etc. A face/mug shot classifier 310 can be trained to detect detailed facial features (e.g., a high resolution classifier). As another example, a weapon classifier (not shown) can be trained to detect different types of weapons or techniques for using different types of weapons. For example, a weapon classifier can be trained to detect when a potential suspects movement indicates a they are pulling a knife or drawing a gun.

Referring again to FIG. 2, the system obtains low resolution images (206) and high resolution images (216). In some implementations, the system does not begin capturing images until mission-specific data is received, e.g., in response to a 911 call or dispatch instructions. In some implementations, the system begins capturing images based on a GPS trigger. For example, the body wearable camera system can begin capturing images once the GPS indicates that an officer is within a threshold radius of a scene that is relevant to the mission-specific data. In some implementations, the system begins capturing low and high resolution images concurrently, but only processes the low resolution images while archiving the high resolution images until after an object is detected in the low resolution images (step 212).

The system extracts course features from the low resolution images (208), and compares the course features with targeted course features (210). For example, the low resolution images can be passed to the selected classifiers and processed by the low resolution classifiers. The low resolution classifiers can extract the course features and compare the extracted features to the descriptive information that was sorted into attribute classes and provided to the classifiers. For example, a body descriptor classifier 306 can extract body features from the low resolution images (e.g., body shape, shirt color, pants color) and compare the extracted features from each image with any body descriptor information about a suspect that was contained in the mission-specific data. The classifiers can output detection data. The detection data can indicate whether an object was detected, an identity of the detected object (e.g., a suspect, a weapon, a getaway vehicle, etc.), and an accuracy or confidence score of the detection, or any combination thereof.

The detection accuracy can be compared to a first alert threshold value (212). If the threshold for providing a first alert is reached, the system sends a first alert 214 to a user interface to alert the officer to a possible detection. In some implementations, the meeting the threshold for providing a first alert also triggers the high resolution image analysis process (steps 218-222).

The system passes one or more high resolution images to the high resolution image classifiers. For example, the body wearable camera system may transmit the high resolution images to a server system or a vehicle based computer system for high resolution analysis. In some implementations, the system must identify high resolution image(s) that correlate with the low resolution images in which the object was detected (e.g., are images of the same scene at the same time). For example, the system can use timestamps applied to the low resolution images in which a particular object was detected to identify corresponding high resolution images captured from a high resolution camera pointed in the same direction as the low resolution camera and have a similar or the same time stamps.

The system extracts detail features from the high resolution images (218), and compares the detail features with targeted fine features (220). For example, the high resolution images can be passed to the selected classifiers and processed by the high resolution classifiers. The high resolution classifiers can extract the detailed features and compare the extracted features to the descriptive information that was sorted into attribute classes and provided to the classifiers and detailed images (e.g., mugshots). For example, a facial descriptor classifier 304 can extract facial features from the high resolution images to perform high accuracy facial recognition. The classifiers then can output confirmation data. The confirmation score of the object detected from the low resolution images. If the confirmation score is greater than the second alert threshold (e.g., confirmation threshold), the system can issue a second alert 224 confirming the low resolution detection. Otherwise, the system can present information negating the first alert to the officer.

The first and second alerts can each include visual, audio, or tactile feedback to a user. In some implementations, the alerts can be shared between multiple officers within a local geographic region. For example, if the body wearable camera system of a first officer detects a weapon and issues an alert, the alert can be transmitted to a second officer's body wearable camera system and provided to the second officer as well.

As used herein the term high resolution images refer to images that have a higher pixel resolution (e.g., pixels per inch), a greater frame rate (e.g., frames per second), or both compared with the images processed by the low or coarse resolution classifiers.

Figure 4:
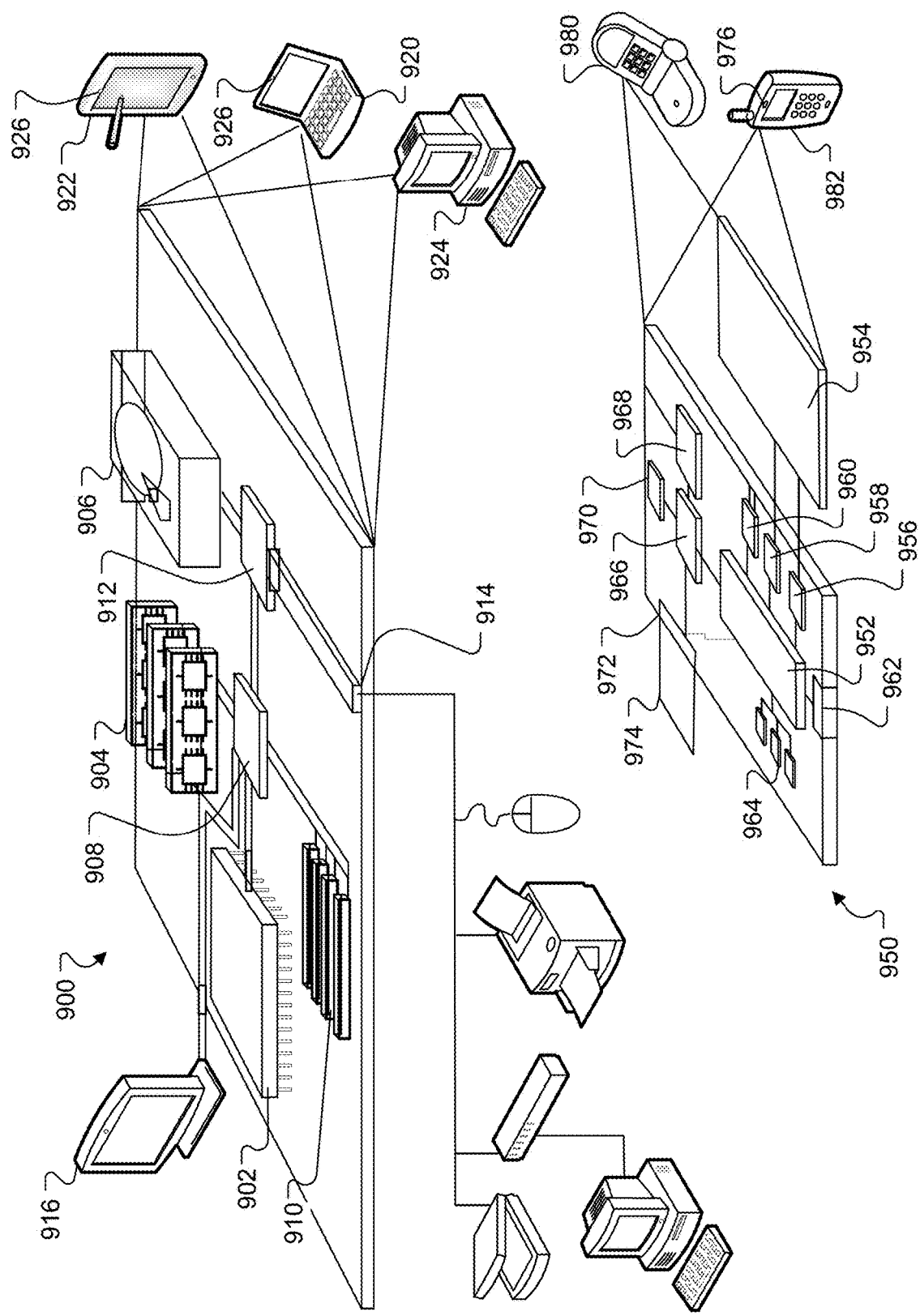
FIG. 4 is a diagram of exemplary computing devices, according to implementations of the present disclosure.

FIG. 4 shows an example of a computing device 900 and a mobile computing device 950 that can be used to implement the techniques described herein. The computing device 900 is intended to represent various forms of digital computers, such as laptops, desktops, workstations, personal digital assistants, and other appropriate computers. The mobile computing device 950 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. In some examples, the computing device 900 includes a camera 926. Each of the processor 902, the memory 904, the storage device 906, the high-speed interface 908, the high-speed expansion ports 910, and the low-speed interface 912, are interconnected using various busses, and can be mounted on a common motherboard or in other manners as appropriate. The processor 902 can process instructions for execution within the computing device 900, including instructions stored in the memory 904 or on the storage device 906 to display graphical information for a graphical user interface (GUI) on an external input/output device, such as a display 916 coupled to the high-speed interface 908. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 904 stores information within the computing device 900. In some implementations, the memory 904 is a volatile or non-volatile memory unit or units. In some implementations, the memory 904 is a non-volatile memory unit or units. The memory 904 can also be another form of computer-readable medium, such as a magnetic or optical disk.

The storage device 906 is capable of providing mass storage for the computing device 900. In some implementations, the storage device 906 can be or contain a computer-readable medium, such as a floppy disk device, a hard disk device, an optical disk device, a tape device, a flash memory device, or other similar solid state memory device, or an array of devices, including devices in a storage area network or other configurations. Instructions can be stored in an information carrier. The instructions, when executed by one or more processing devices (for example, processor 902), perform one or more methods, such as those described above. The instructions can also be stored by one or more storage devices such as computer- or machine-readable mediums (for example, the memory 904, the storage device 906, or memory on the processor 902).

The high-speed interface 908 manages bandwidth-intensive operations for the computing device 900, while the low-speed interface 912 manages lower bandwidth-intensive operations. Such allocation of functions is an example only. In some implementations, the high-speed interface 908 is coupled to the memory 904, the display 916 (e.g., through a graphics processor or accelerator), and to the high-speed expansion ports 910, which may accept various expansion cards (not shown). In the implementation, the low-speed interface 912 is coupled to the storage device 906 and the low-speed expansion port 914. The low-speed expansion port 914, which may include various communication ports (e.g., USB, Bluetooth, Ethernet, wireless Ethernet) can be coupled to one or more input/output devices, such as a keyboard, a pointing device, a scanner, a camera (e.g., a web camera), or a networking device such as a switch or router, e.g., through a network adapter.

The computing device 900 can be implemented in a number of different forms, as shown in the figure. For example, it can be implemented in a personal computer such as a laptop computer 920. It can also be implemented as a tablet computer 922 or a desktop computer 924. Alternatively, components from the computing device 900 can be combined with other components in a mobile device, such as a mobile computing device 950. Each type of such devices can contain one or more of the computing device 900 and the mobile computing device 950, and an entire system can be made up of multiple computing devices communicating with each other.

The mobile computing device 950 includes a processor 952, a memory 964, an input/output device such as a display 954, a communication interface 966, a transceiver 968, and a camera 976, among other components. The mobile computing device 950 can also be provided with a storage device, such as a micro-drive or other device, to provide additional storage. Each of the processor 952, the memory 964, the display 954, the communication interface 966, and the transceiver 968, are interconnected using various buses, and several of the components can be mounted on a common motherboard or in other manners as appropriate.

The processor 952 can execute instructions within the mobile computing device 950, including instructions stored in the memory 964. The processor 952 can be implemented as a chipset of chips that include separate and multiple analog and digital processors. The processor 952 can provide, for example, for coordination of the other components of the mobile computing device 950, such as control of user interfaces, applications run by the mobile computing device 950, and wireless communication by the mobile computing device 950.

The processor 952 can communicate with a user through a control interface 958 and a display interface 956 coupled to the display 954. The display 954 can be, for example, a TFT (Thin-Film-Transistor Liquid Crystal Display) display or an OLED (Organic Light Emitting Diode) display, or other appropriate display technology. The display interface 956 can include appropriate circuitry for driving the display 954 to present graphical and other information to a user. The control interface 958 can receive commands from a user and convert them for submission to the processor 952. In addition, an external interface 962 can provide communication with the processor 952 so as to enable near area communication of the mobile computing device 950 with other devices. The external interface 962 can provide, for example, wired communication in some implementations, or for wireless communication in other implementations, and multiple interfaces can also be used.

The memory 964 stores information within the mobile computing device 950. The memory 964 can be implemented as one or more of a computer-readable medium or media, a volatile memory unit or units, or a non-volatile memory unit or units. An expansion memory 974 can also be provided and connected to the mobile computing device 950 through an expansion interface 972, which may include, for example, a SIMM (Single In Line Memory Module) card interface. The expansion memory 974 may provide extra storage space for the mobile computing device 950, or may also store applications or other information for the mobile computing device 950. Specifically, the expansion memory 974 can include instructions to carry out or supplement the processes described above, and can include secure information also. Thus, for example, the expansion memory 974 can be provided as a security module for the mobile computing device 950, and can be programmed with instructions that permit secure use of the mobile computing device 950. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, instructions are stored in an information carrier that the instructions, when executed by one or more processing devices (for example, processor 952), perform one or more methods, such as those described above. The instructions can also be stored by one or more storage devices, such as one or more computer- or machine-readable mediums (for example, the memory 964, the expansion memory 974, or memory on the processor 952). In some implementations, the instructions can be received in a propagated signal, for example, over the transceiver 968 or the external interface 962.

The mobile computing device 950 can communicate wirelessly through the communication interface 966, which can include digital signal processing circuitry where necessary. The communication interface 966 can provide for communications under various modes or protocols, such as GSM voice calls (Global System for Mobile communications), SMS (Short Message Service), EMS (Enhanced Messaging Service), or MMS messaging (Multimedia Messaging Service), CDMA (Code Division Multiple Access), TDMA (Time Division Multiple Access), PDC (Personal Digital Cellular), WCDMA (Wideband Code Division Multiple Access), CDMA2000, or GPRS (General Packet Radio Service), among others. Such communication can occur, for example, through the transceiver 968 using a radio-frequency. In addition, short-range communication can occur, such as using a Bluetooth, WiFi, or other such transceiver (not shown). In addition, a GPS (Global Positioning System) receiver module 970 can provide additional navigation- and location-related wireless data to the mobile computing device 950, which can be used as appropriate by applications running on the mobile computing device 950.

The mobile computing device 950 can also communicate audibly using an audio codec 960, which can receive spoken information from a user and convert it to usable digital information. The audio codec 960 can likewise generate audible sound for a user, such as through a speaker, e.g., in a handset of the mobile computing device 950. Such sound can include sound from voice telephone calls, may include recorded sound (e.g., voice messages, music files, etc.) and may also include sound generated by applications operating on the mobile computing device 950.

The mobile computing device 950 can be implemented in a number of different forms, as shown in the figure. For example, it can be implemented as a cellular telephone 980. The mobile computing device 950 can also be implemented as part of a smart-phone 982, tablet computer, personal digital assistant, or other similar mobile device.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Although the present disclosure is described in the context of capturing images of documents, and specifically ID documents, the techniques, systems, and devices described herein can be applicable in other contexts as well. For example, the techniques, systems, and devices described herein may be used for capturing digital images of, other types of documents, bank checks, printed photographs, etc.

What is claimed is:

1. A computer-implemented method executed by one or more processors, the method comprising:
   receiving mission specific data, the mission specific data including non-image data descriptive of attributes of a suspect;
   converting the mission specific data into attribute classes recognizable by image recognition classifiers, wherein the image recognition classifiers are pre-trained to detect objects corresponding to the attributed classes within digital images;
   obtaining, from a wearable camera system, low resolution images of a scene and high resolution images of the scene;
   detecting, within the low resolution images using a low resolution image classifier, an object that corresponds to one of the attribute classes;
   in response to detecting the object that corresponds to one of the attribute classes:
      providing, for presentation to a user of the wearable camera system by a presentation system, an first alert indicating a potential detection of the suspect, and
      providing, to a high resolution image classifier, the high resolution images;
   obtaining, from the high resolution image classifier, a confirmation of the detected object from the low resolution images; and
   in response to obtaining the confirmation, providing, for presentation to the user by the presentation system, a second alert indicating confirmation that the object has been detected.

2. The method of claim 1, wherein the first alert or the second alert comprises activating a tactile output device on a wearable camera system.

3. The method of claim 1, wherein providing the first alert comprises causing the first alert to be presented on a head's up display of a wearable camera system.

4. The method of claim 1, wherein detecting the object that corresponds to one of the attribute classes comprises determining that features extracted from the low resolution image by the low resolution image classifier correspond to the object with an accuracy that meets or exceeds a first alert threshold accuracy value.

5. The method of claim 1, wherein providing, to a high resolution image classifier, the high resolution images comprises transmitting the high resolution image to a server system, and
   wherein the high resolution image classifier comprises a convolutional neural network.

6. The method of claim 1, wherein the mission-specific data is received form a law enforcement dispatch server system.

7. The method of claim 1, wherein converting the mission specific data into attribute classes recognizable by image recognition classifiers comprises assigning descriptive data from the mission-specific data into relevant attribute classes; and
   providing the descriptive data from each attribute class as input to a low resolution classifier associated the attribute class.

8. A system comprising:
   at least one processor; and a data store coupled to the at least one processor having instructions stored thereon which, when executed by the at least one processor, causes the at least one processor to perform operations comprising:
   receiving mission specific data, the mission specific data including non-image data descriptive of attributes of a suspect;
   converting the mission specific data into attribute classes recognizable by image recognition classifiers, wherein the image recognition classifiers are pre-trained to detect objects corresponding to the attributed classes within digital images;
   obtaining, from a wearable camera system, low resolution images of a scene and high resolution images of the scene;
   detecting, within the low resolution images using a low resolution image classifier, an object that corresponds to one of the attribute classes;
   in response to detecting the object that corresponds to one of the attribute classes:
      providing, for presentation to a user of the wearable camera system by a presentation system, an first alert indicating a potential detection of the suspect, and
      providing, to a high resolution image classifier, the high resolution images;
   obtaining, from the high resolution image classifier, a confirmation of the detected object from the low resolution images; and
   in response to obtaining the confirmation, providing, for presentation to the user by the presentation system, a second alert indicating confirmation that the object has been detected.

9. The system of claim 8, wherein the first alert or the second alert comprises activating a tactile output device on a wearable camera system.

10. The system of claim 8, wherein providing the first alert comprises causing the first alert to be presented on a head's up display of a wearable camera system.

11. The system of claim 8, wherein detecting the object that corresponds to one of the attribute classes comprises determining that features extracted from the low resolution image by the low resolution image classifier correspond to the object with an accuracy that meets or exceeds a first alert threshold accuracy value.

12. The system of claim 8, wherein providing, to a high resolution image classifier, the high resolution images comprises transmitting the high resolution image to a server system, and
   wherein the high resolution image classifier comprises a convolutional neural network.

13. The system of claim 8, wherein the mission-specific data is received form a law enforcement dispatch server system.

14. The system of claim 8, wherein converting the mission specific data into attribute classes recognizable by image recognition classifiers comprises assigning descriptive data from the mission-specific data into relevant attribute classes; and providing the descriptive data from each attribute class as input to a low resolution classifier associated the attribute class.

15. A non-transitory computer readable storage medium storing instructions that, when executed by at least one processor, cause the at least one processor to perform operations comprising:

receiving mission specific data, the mission specific data including non-image data descriptive of attributes of a suspect;

converting the mission specific data into attribute classes recognizable by image recognition classifiers, wherein the image recognition classifiers are pre-trained to detect objects corresponding to the attributed classes within digital images;

obtaining, from a wearable camera system, low resolution images of a scene and high resolution images of the scene;

detecting, within the low resolution images using a low resolution image classifier, an object that corresponds to one of the attribute classes;

in response to detecting the object that corresponds to one of the attribute classes:

providing, for presentation to a user of the wearable camera system by a presentation system, an first alert indicating a potential detection of the suspect, and providing, to a high resolution image classifier, the high resolution images;

obtaining, from the high resolution image classifier, a confirmation of the detected object from the low resolution images; and in response to obtaining the confirmation, providing, for presentation to the user by the presentation system, a second alert indicating confirmation that the object has been detected.

16. The medium of claim 15, wherein the first alert or the second alert comprises activating a tactile output device on a wearable camera system.

17. The medium of claim 15, wherein providing the first alert comprises causing the first alert to be presented on a head's up display of a wearable camera system.

18. The medium of claim 15, wherein detecting the object that corresponds to one of the attribute classes comprises determining that features extracted from the low resolution image by the low resolution image classifier correspond to the object with an accuracy that meets or exceeds a first alert threshold accuracy value.

19. The medium of claim 15, wherein providing, to a high resolution image classifier, the high resolution images comprises transmitting the high resolution image to a server system, and wherein the high resolution image classifier comprises a convolutional neural network.

20. The medium of claim 15, wherein converting the mission specific data into attribute classes recognizable by image recognition classifiers comprises assigning descriptive data from the mission-specific data into relevant attribute classes; and providing the descriptive data from each attribute class as input to a low resolution classifier associated the attribute class.

\* \* \* \* \*